J. H. SMITH.
DRAFT APPLIANCE.
APPLICATION FILED JUNE 1, 1912.

1,087,842.

Patented Feb. 17, 1914.

Witnesses
Francis Mac Nerhany
N. Randolph Jr.

Inventor
J. Howard Smith
By Chas A Briscoe
Attorney

UNITED STATES PATENT OFFICE.

JOHN HOWARD SMITH, OF DENTON, NEBRASKA.

DRAFT APPLIANCE.

1,087,842.

Specification of Letters Patent.

Patented Feb. 17, 1914.

Application filed June 1, 1912. Serial No. 700,940.

*To all whom it may concern:*

Be it known that I, JOHN HOWARD SMITH, a citizen of the United States, residing at Denton, in the county of Lancaster and State of Nebraska, have invented certain new and useful Improvements in Draft Appliances, of which the following is a specification.

My invention relates to draft appliances to be used on gang plows and the like, and has for its object the provision of an appliance which will evenly distribute the draft to each animal and in my construction enables the use of four animals hitched abreast, so that one animal may walk in the furrow previously plowed and the other three animals walk on the unplowed ground adjacent to the furrow.

Heretofore, in an ordinary four-horse hitch appliance, it has been necessary to secure the appliance to one corner of the plow in order to throw it to one side far enough to provide for one of the animals following the furrow, while the other animals walk on the land that has been unplowed, but the great objection to this construction of evener, has been that the draft has increased on certain animals.

A further object of my invention is the provision of a controller bar by which the draft is placed upon the animal or animals that happen to pull ahead of the rest and will allow for the remaining animals to catch up.

Figure 1:
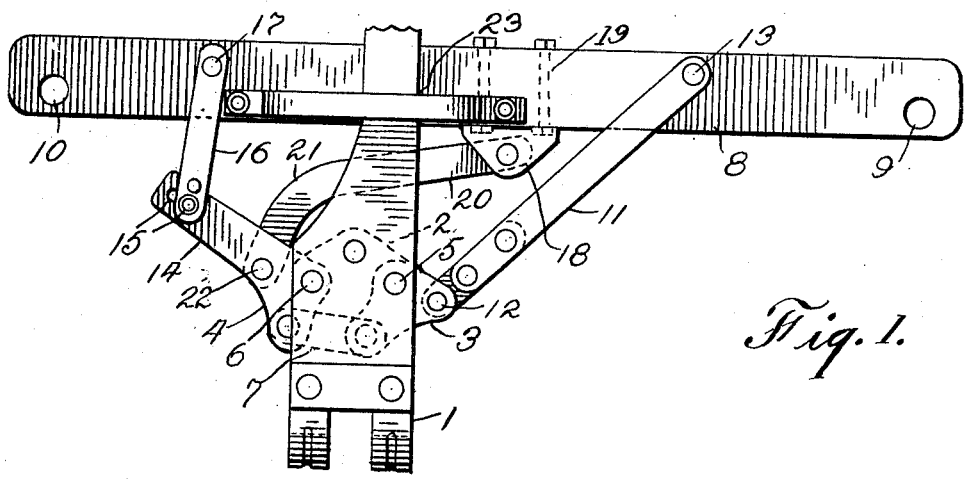
Figure 2:
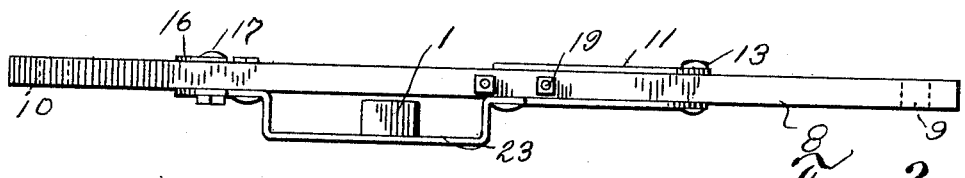
Figure 3:
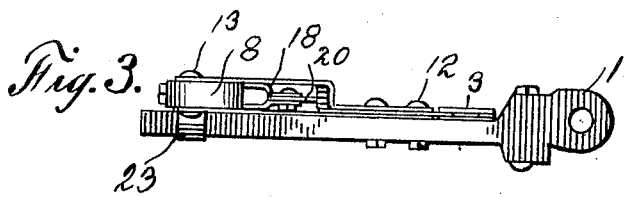
Figure 4:
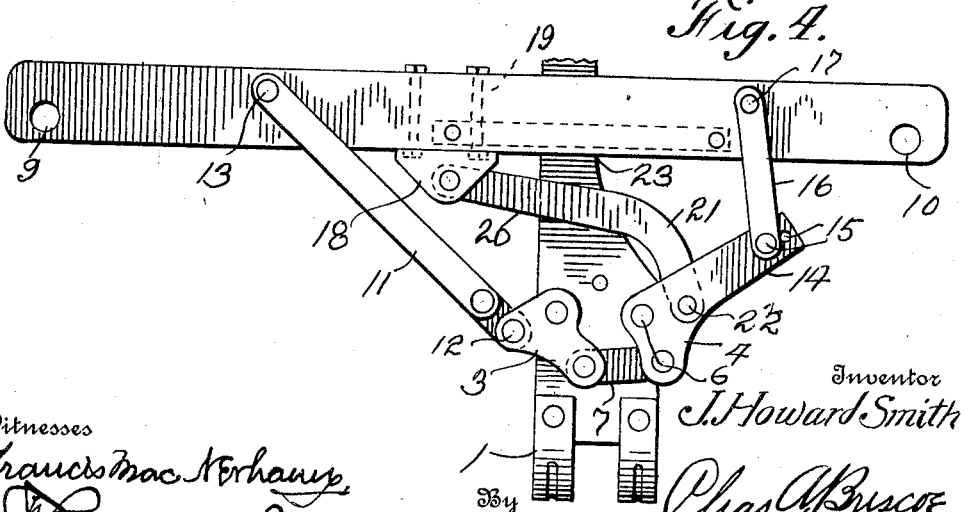

My invention will be described in detail hereinafter and illustrated in the accompanying drawings, in which, Figure 1 is a bottom plan view of my improved draft equalizer; Fig. 2, a front end view; Fig. 3, a side view; and Fig. 4, a top plan view with the cover plate for the equalizing levers removed.

In the drawings similar reference characters will be used to designate corresponding parts throughout the several views.

My improved draft appliance consists of a draft member 1 adapted to be hitched to the front end of a plow or other machinery to be drawn, and having secured thereto a plate 2 spaced apart from the draft member 1 to receive the bell-crank levers 3 and 4 respectively. The bell-crank levers 3 and 4 are pivotally mounted on the draft member 1 and to the plate 2 by means of bolts 5 and 6 respectively, and are connected by means of a link 7.

8 indicates the draft bar having its two ends provided with openings 9 and 10 to receive the hitching members for doubletrees (not shown), said doubletrees being of the ordinary type and adapted to have whiffletrees, also (not shown), secured thereto. It is considered unnecessary to illustrate the doubletrees and swingletrees as these devices are to be of ordinary construction and are well known to persons familiar with the art. The bell-crank lever 3 is connected with the draft bar 8 between the terminal in which is the opening 9 and its middle portion by means of a rod 11 pivotally secured as shown at 12, to said bell-crank lever and to the draft bar 8 at 13. The bell-crank lever 4 has a relatively longer end 14 than the bell-crank lever 3 and is provided with a series of openings 15 therein in one of which is pivotally mounted a bar 16 that is pivotally secured as shown at 17, to the draft bar 8, intermediate of the terminal in which is the opening 10, and the middle of said bar.

Secured to the rear margin of the draft bar 8 and slightly nearer the end in which is the opening 9 than the other, is a bracket 18. Said bracket is secured to the draft bar 8 by means of bolts 19 or other suitable fastenings secured to said draft bar, and pivotally secured to said bracket 18 is a link 20 having its end farthest removed from said bracket 18 curved rearwardly as shown at 21, its terminal secured to the lever 4 intermediate of the outer terminal of said lever and the pivot 6, as shown at 22.

23 indicates a supporting plate secured to the draft bar 8 and riding on the forward terminal of the draft member 1 to support the bar 8 thereon.

In use, it will be apparent, that when the animals at the two ends of the draft bar 8 are pulling with equal strain so that the draft bar is in a position perpendicular to the draft member 1, as shown in the drawings, the pull on the draft member is equally divided between the animals at the two ends of the bar. The controller bar 20 also operates to equalize the draft between the animals at the two ends of the draft bar, as because of the connection between the lever 4 and the bracket 18 through said controller bar 20, should the animals hitched in the opening 9 get ahead of the animals hitched in the opening 10, some of the draft would be temporarily transferred from the animals on the rear end of the draft bar to the animals at the other end, until said animals have an opportunity to regain their position with the draft bar perpendicular to the draft member 1. On the other hand, should the animals hitched in the opening 10 get ahead of the animals hitched at the other end of the draft bar, the controller bar 20 would automatically throw more of the weight on the animals in the lead until the rearmost animals would have an opportunity to regain their position.

Having thus described my invention, what I claim is:—

A draft appliance comprising a draft member, a plate secured to said draft member in spaced relation thereto, a pair of bell-crank levers pivotally secured to the draft member, one of said bell-crank levers being of greater length than the other, a link pivotally secured to the ends of said bell-crank levers and adapted to join them together, a pair of rods pivotally connected to the free end of the bell-crank levers, one of said rods being of greater length than the other and adapted to be secured to the bell-crank lever of shorter length, a draft rod pivotally connected to said rods adjacent one end thereof, a curved link pivotally secured to the bell-crank lever of greater length intermediate its length and pivoted to the center of the draft rod.

In testimony whereof I affix my signature in presence of two witnesses.

JOHN HOWARD SMITH.

Witnesses:
JOHN L. WOLFE,
M. T. GILBERT.

---

Copies of this patent may be obtained for five cents each, by addressing the "Commissioner of Patents, Washington, D. C."